United States Patent [19]
DiCicco et al.

[11] Patent Number: 5,892,554
[45] Date of Patent: Apr. 6, 1999

[54] SYSTEM AND METHOD FOR INSERTING STATIC AND DYNAMIC IMAGES INTO A LIVE VIDEO BROADCAST

[75] Inventors: Darrell S. DiCicco, Cream Ridge, N.J.; Karl Fant, Minneapolis, Minn.

[73] Assignee: Princeton Video Image, Inc., Lawrenceville, N.J.

[21] Appl. No.: 563,598

[22] Filed: Nov. 28, 1995

Related U.S. Application Data

[60] Provisional application No. 60/000,279 Jun. 16, 1995.

[51] Int. Cl.$^6$ .................................................. H04N 9/74
[52] U.S. Cl. ........................ 348/584; 348/589; 348/590; 382/284
[58] Field of Search ................................... 382/100, 173, 382/295, 103, 284, 282; 348/589, 590, 588, 593, 584; 345/118, 133, 135, 125

[56] References Cited

U.S. PATENT DOCUMENTS

| | | | |
|---|---|---|---|
| 3,731,188 | 5/1973 | Smith | 324/76.31 |
| 4,084,184 | 4/1978 | Crain | 348/116 |
| 4,385,322 | 5/1983 | Hubach et al. | 348/243 |
| 4,442,454 | 4/1984 | Powell | 348/618 |
| 4,447,886 | 5/1984 | Meeker | 364/725 |
| 4,523,230 | 6/1985 | Carlson et al. | 348/623 |
| 4,528,589 | 7/1985 | Block et al. | 380/20 |
| 4,539,585 | 9/1985 | Spackova et al. | 382/100 |
| 4,674,125 | 6/1987 | Carlson et al. | 382/303 |
| 4,692,806 | 9/1987 | Anderson et al. | 348/399 |
| 4,698,843 | 10/1987 | Burt et al. | 382/275 |
| 4,703,514 | 10/1987 | van der Wal | 382/302 |
| 4,792,972 | 12/1988 | Cook, Jr. | 380/20 |
| 4,817,175 | 3/1989 | Tenenbaum et al. | 382/303 |
| 5,063,603 | 11/1991 | Burt | 382/115 |
| 5,099,319 | 3/1992 | Esch et al. | 348/9 |
| 5,107,252 | 4/1992 | Traynar et al. | 345/139 |
| 5,142,576 | 8/1992 | Nadan | 380/20 |
| 5,233,423 | 8/1993 | Jernigan et al. | 348/564 |
| 5,264,933 | 11/1993 | Rosser et al. | 348/581 |
| 5,309,174 | 5/1994 | Minkus | 345/204 |
| 5,353,392 | 10/1994 | Luguet et al. | 395/135 |
| 5,436,672 | 7/1995 | Medioni et al. | 348/591 |
| 5,488,675 | 1/1996 | Hanna | 382/284 |
| 5,491,517 | 2/1996 | Kreitman et al. | 348/581 |
| 5,566,251 | 10/1996 | Hanna et al. | 382/284 |

FOREIGN PATENT DOCUMENTS

| | | |
|---|---|---|
| 02306782 | of 0000 | Japan . |
| PCTGB9000925 | of 0000 | WIPO . |
| PCTUS9207498 | of 0000 | WIPO . |
| PCTUS9411527 | of 0000 | WIPO . |

OTHER PUBLICATIONS

"Fast Algorithms For Estimating Local Image Properties," by Peter J. Burt.
"Pyramid–Based Extraction of Local Image Features with Application to Motion and Texture Analysis" by Peter J. Burt.
"Pyramidal Systems for Computer Vision," V. Cantoni and S. Levialdi.
"Multiresolution Image Processing and Analysis," A. Rosenfeld.
"Object Tracking With A Moving Camera: An Application of Dynamic Motion Analysis" by P.J. Burt, et al.

*Primary Examiner*—Nathan Flynn
*Attorney, Agent, or Firm*—Woodbridge & Associates

[57] ABSTRACT

A live video insertion system efficiently places static or dynamic images into a live broadcast. The system initially identifies natural landmarks within the video scene that can be automatically identified and tracked as the field of view of the camera pans and zooms across the scene. The locations of the landmarks are mathematically modeled and stored as a constellation of locations on a mathematical grid. An arbitrary reference point, preferably not necessarily coincident with a selected natural landmark, is located within or without of the grid and used as an origin for the purpose of inserting the static or dynamic image within the field of view of the camera. For static images, it is frequently desirable to place an edge or border of the image to be inserted on the reference point. For dynamic insertions, the distance between the reference point and the inserted dynamic image is automatically changed from frame to frame in order to make the image appear as though it's translating or changing, or both.

45 Claims, 13 Drawing Sheets

$x_0, y_0$ • ORIGIN $x_0, y_0$ • ORIGIN

FIG. 8A
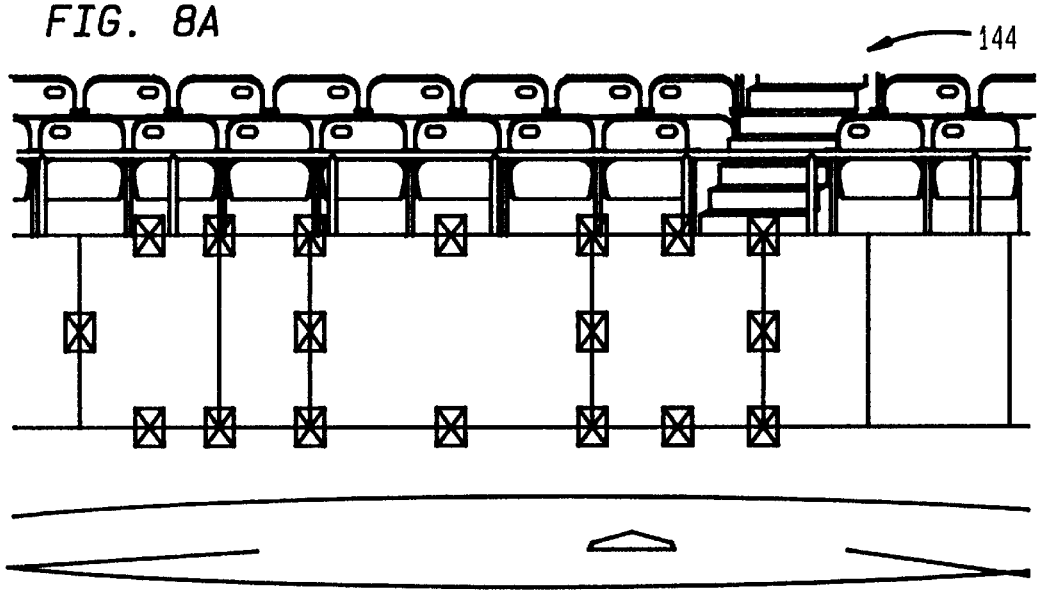
LEVEL OF DECIMATION = 0
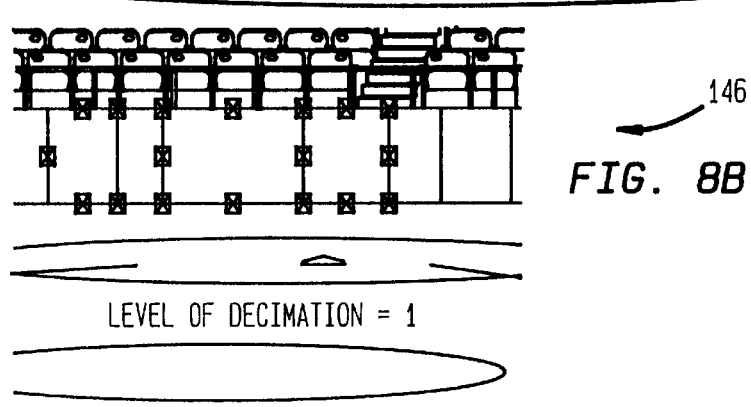
FIG. 8B
LEVEL OF DECIMATION = 1
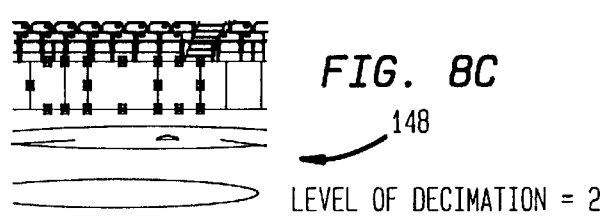
FIG. 8C
LEVEL OF DECIMATION = 2
FIG. 8D
LEVEL OF DECIMATION = 3

LEVEL OF DECIMATION = 0

LEVEL OF DECIMATION = 1

LEVEL OF DECIMATION = 2

LEVEL OF DECIMATION = 3

SYSTEM AND METHOD FOR INSERTING STATIC AND DYNAMIC IMAGES INTO A LIVE VIDEO BROADCAST

CROSS-REFERENCE TO RELATED APPLICATIONS

This patent application claims the benefit of U.S. Provisional Patent Application No. 60/000,279 filed on Jun. 16, 1995 and entitled "APPARATUS AND METHOD OF INSERTING IMAGES INTO TELEVISION DISPLAYS."

BACKGROUND OF THE INVENTION

1. Field of the Invention

A system and method facilitates the insertion of dynamic and static images and other indicia into live broadcast video images on a real time basis so that they appear to be part of the original broadcast.

2. Description of Related Art

The present invention represents a significant improvement over various prior art approaches to the problem of inserting images into a live video broadcast. In particular, the prior art techniques suffer from the inability to rapidly detect and track landmarks and insert a dynamic or static image into a live video broadcast in a realistic manner. Moreover, many prior art techniques are computationally intense and require cumbersome and complicated computer systems to achieve their goals.

An early approach to video insertion is described in U.S. Pat. No. 4,539,585 entitled "PREVIEWER" and issued on Sep. 3, 1985 to Spackova, et al. According to that teaching, artificial landmarks, in the form of triangles, are placed on an individual. By lining up the artificial landmarks with corresponding points on an insertable image, it is possible to superimpose a variety of different inserts into the field of view. For example, it is possible, using the artificial triangle landmarks, to virtually place a variety of different clothing items onto a human model, presumably a prospective customer, so that he or she can preview the way he or she would look wearing that particular item of clothing. While the use of artificial landmarks may be acceptable in certain contexts, it does not work well where the background scene might be a large sports arena or the like because they must be large in order to be seen and, therefore, are cumbersome to install and may look strange in the context of a sporting event.

Another approach to the same problem is to place X and Y sensors on a camera. As the camera pans across a scene, the X and Y sensors track the position and movement of the camera. This technique has limited success in relatively small quarters, but if the field of view is a sports arena or like, the inherent error, or "jitter," in the X and Y sensors produces a noticeable, and unacceptable, error in the placement of the inserted image. This "jitter" is particularly objectionable during occlusion processing. U.S. Pat. No. 4,084,184 issued to David W. Crain on Apr. 11, 1978 demonstrates an early approach for using data obtained by sensors placed on or about a camera to aid in tracking images within a scene. In Crain, sensor means such as gyro compasses, potentiometers, inertial navigation instruments, and inclinometers are used to generate information regarding camera tilt angles, aperture angles, and the like. The use of X and Y encoders in the context of a video insertion system has also been described, among other places, in Patent Abstracts of Japan, "Picture Synthesizer," Vol. 15, No. 8 (E-1042) 8 Mar. 1991 and JP-A-02 306 782 (Asutoro Design K. K.) 20 Dec. 1990. It is also believed that the use of X and Y sensors has previously been used in Europe to assist in the placement of inserts into live video broadcasts.

More recently, efforts have been made to take advantage of pattern recognition techniques to identify landmarks that are naturally occurring within an insert target area. One of the earliest efforts to take advantage of improved pattern recognition techniques to identify natural landmarks on the edge or around an insert target area is described in U.S. Pat. No. 5,264,933 entitled "TELEVISION DISPLAYS HAVING SELECTED INSERTED INDICIA" issued on Nov. 23, 1993 to Rosser, et al. U.S. Pat. No. 5,264,933 was based, in part, on British Patent Application Serial No. 9102995.5 filed on Feb. 13, 1991 which was based on an earlier British Provisional Patent Application filed Feb. 14, 1990 which was further related to British Patent Application Serial No. 9019770.8 filed on Sep. 10, 1990 by Roy J. Rosser. U.S. Pat. No. 5,264,933 discusses, in detail, a method for placing a logo or other indicia into, for example, a tennis court during a live broadcast. In U.S. Pat. No. 5,264,933, a target zone is pre-selected for receiving insertable images into the broadcast image. The target zone is spatially related to certain landmarks that represent distinguishable characteristics of the background scene being captured by the camera. The system always looks for landmarks in the target zone but the patent also discloses the fact that landmarks outside of the target zone can be employed too. Landmarks identified by the processor during broadcast are compared against a reference set of landmarks identified in a reference image. When sufficient verification has occurred, the operator inserts an image into the pre-selected target zone of the broadcast image. For example, in a football game the target zone could be the space between the uprights of a goalpost. Or, in a baseball game, the target zone could be a portion of the wall behind home plate. A relatively exhaustive description of the prior art up to that date is set forth in U.S. Pat. No. 5,264,933 and the references cited therein. Some of the more relevant patent references cited in the foregoing patent include U.S. Pat. Nos: 3,731,188; 4,442,454; 4,447,886; 4,523,230; 4,692,806 and 4,698,843.

Rosser, et al., U.S. Pat. No. 5,264,933 describes, among other things, how the boundaries of a tennis court can be identified and used as landmarks for the purpose of inserting a commercial logo into a live broadcast. The landmarks are identified by means of a "Burt Pyramid." The Burt Pyramid technique is discussed in a number of patents, such as U.S. Pat. Nos. 4,385,322; 4,674,125; 4,692,806; 4,703,514 and 5,063,603, as well as in publications such as "Fast Algorithms For Estimating Local Image Properties," by Peter J. Burt, Computer Vision, Graphics and Imaging Processing, 21 pp. 368–382, 1983, and "Pyramid-Based Extraction of Local Image Features with Application to Motion and Texture Analysis" by Peter J. Burt, SPIE, Vol. 360, pp. 114–124. See also "Pyramidal Systems for Computer Vision," V. Cantoni and S. Levialdi, NATO ASI Series F, Vol. 25, Springer-Verlag, 1986; "Multiresolution Image Processing and Analysis," A. Rosenfeld, editor, Springer-Verlag 1984, and "Object Tracking With a Moving Camera: An Application of Dynamic Analysis" by P. J. Burt, et al., "Proceedings of the Workshop on Visual Motion," Irvine, Calif., Mar. 20–22,1989. The Burt Pyramid technique described above and known in the prior art involves the reduction of an image into decimated, low resolution, versions which permit the rapid location and identification of prominent features, generally referred to as landmarks. The Burt Pyramid is one of several well known, prior art, techniques that can be employed to identify landmark features in an image for the purpose of replacing a portion of the image with an insert in the context of a live video broadcast.

Luquet, et al., U.S. Pat. No. 5,353,392, discloses a system that is limited to modifying the same zone, referred to as a target zone, in successive images. Thus, by limiting the insertion operation to a pre-determined target area, Luquet '392 suffers from some of the same drawbacks as Rosser '933, namely, that the inserted image is tied to a fixed location, or target zone, within the overall image. The present invention, as discussed in the "Detailed Description of the Preferred Embodiment" later in this disclosure, is capable of inserting an image virtually anywhere within the overall broadcast scene independent of the identification of a specific insertion or target zone.

Thus the basic concept for many recent prior art inventions, such as set forth in U.S. Pat. Nos. 5,264,933 and 5,353,392 described above, is to replace a preselected region of the current image or an existing advertisement or target zone in the current image.

U.S. Pat. No. 5,107,252 entitled "VIDEO PROCESSING SYSTEM" and issued on Apr. 21, 1995, naming as inventors, Michael J. Traynar and Ian McNiel and assigned to Quantel Limited, Newbury, United Kingdom, is similar to these prior art approaches in that the edges of the insertion area itself are specifically identified with a stylus and thereby fixed in the scene.

Another system that is primarily directed towards the identification of at least some landmarks within a designated insertion area is described in PCT Application PCT/US92/07498 entitled "VIDEO MERGING EMPLOYING PATTERN-KEY INSERTION" claiming a U.S. priority date of Sep. 18, 1991 and an international filing date of Sep. 10, 1992 and listing as inventors Keith James Hanna and Peter Jeffrey Burt.

Zoom correction and occlusion processing are discussed in PCT application PCT/US94/11527 assigned to ORAD, Inc. According to that system sensors are placed on the periphery of the camera zoom lens. The sensors mechanically detect the rotation of the zoom lens and calculate a corresponding zoom factor. The zoom factor is then fed to a computer system to correct the size of the intended insert. Systems of this type suffer from mechanical drawbacks such as jitter which may introduce an error factor rendering the size of an insertable image unacceptably variable. The present invention overcomes such mechanical drawbacks by determining the changed positions of landmarks within the current image and automatically applying a corresponding zoom factor to the insertable image. The present invention relies on landmark positions within the current image and not on external factors subject to motion or jitter. Thus, any sudden, unwanted camera motion or lens movement will not affect the zoom adjustment calculations.

Other patents of possible relevance to the foregoing might include the following:

U.S. Pat. Nos. 4,528,589; 4,792,972; 4,817,175; 5,099,319; 5,142,576; 5,233,423; 5,309,174; 5,436,672; and PCT/GB90/00925.

Although '933 discloses insertion of video images in the insert location, the above prior art is generally directed towards the insertion of a static image, i.e., non-moving image, into a live video broadcast. Therefore, being able to identify the boundaries of a particular insertion, or "target," area may be important. The situation becomes much more difficult if it is desired to place a static image someplace other than in the "target zone" or to insert a dynamic image, i.e., one that can move, into a live video scene. The insertable image may be dynamic either in the sense that the image moves across the scene or the image itself changes from frame to frame, or both. Imagine, for example, the difficulties of superimposing a rabbit, beating a drum, simultaneously moving across the field of view into a live video broadcast.

Insofar as understood, none of the prior art described above, nor any known to the applicants, can efficiently and satisfactorily solve the problem of inserting static and/or dynamic images into a live video scene in as realistic a manner as the present invention.

SUMMARY OF THE INVENTION

Briefly described, the invention comprises a system and method for inserting static and dynamic images into a live video broadcast in a realistic fashion on a real time basis. Initially, the operator of the system selects certain natural landmarks in a scene that are suitable for subsequent detection and tracking. Alternatively, landmarks may be selected by the electronic system, then approved by the operator or not. It is important that the natural landmarks survive decimation, i.e., remain recognizable, during the recognition step which may be Burt Pyramid analysis. Landmarks preferably comprise sharp, bold and clear vertical, horizontal, diagonal or corner features within the scene visible to the video camera as it pans and zooms. Typically, at least three or more natural landmarks are selected. It is understood that the landmarks are distributed throughout the entire scene, such as a baseball park or a football stadium, and that the field of view of the camera at any instant is normally significantly smaller than the full scene that may be panned. The landmarks are often located outside of the destination point or area where the insert will be placed because the insert area is typically too small to include numerous identifiable landmarks and the insertable image may be a dynamic one and, therefore, it has no single, stationary target destination.

The system models the recognizable natural landmarks on a deformable two-dimensional grid. An arbitrary, non-landmark, reference point is chosen within the scene. The reference point is mathematically associated with the natural landmarks and is subsequently used to locate the insertion area. In the case of static insertions, a point on the insert located, for example, at either the lower left or upper right hand corner of the insert, such as the case where the insert might be in the shape of a square or rectangle, may be aligned with the reference point. Alternatively, the insert may be aligned at any fixed distance from the reference point. If the insert is dynamic, then the point is used as an origin to drive the dynamic image throughout the field of view. In that case, the location of the dynamic image changes from frame to frame as the distance of the dynamic image incrementally changes with respect to the reference point. In the case of either a fixed or dynamic image, it is very possible for the reference point to be located out of the field of view of the camera. In fact, the reference point may be any point on the grid including the origin.

Prior to the live video insertion process, the system operator prepares artwork of the image to be inserted and adjusts it for perspective, i.e., shape. Because the system knows the mathematical relationship between the landmarks in the scene, it can automatically determine the zoom factor and X, Y position adjustment that must be applied to the insertable image just prior to insertion. Thereafter, when the camera zooms in and out and changes its field of view as it pans, the insertable image remains properly scaled and proportioned with respect to the other features in the field of view so that it looks natural to the home viewer. As long as the field of view includes at least three suitable landmarks, the system can always establish where it is with respect to the reference point. Therefore, it is possible to pan into and out of a scene and have the insertable image naturally appear in the scene rather than "pop up" as has been the case with some prior art systems. According to the preferred embodiment of the present invention, after the image appears in the scene, the operator can make further minor adjustments such as moving the insertable image up and down with a pair of X and Y buttons and/or adjust it for size (i.e., zoom) to better fit the background against which it is located. Such adjustments may take place prior to or during the event.

The system can easily place an insertable image at or in any location. Because the system does not require substantial amounts of computational power, as is required by most other systems, the insertable image appears much more quickly and naturally in a given scene and does not "pop up" as is the case with other prior art systems.

These and other features of the present invention will be more fully understood by referring to the following drawings.

BRIEF DESCRIPTION OF THE DRAWINGS

FIGS. 8A–D illustrate four levels of decimation of the detail shown in FIG. 2 where the resolution is halved in each level.

DETAILED DESCRIPTION OF THE PREFERRED EMBODIMENT

During the course of this description like numbers will be used to identify like elements according to the different figures which illustrate the invention.

As previously described in pending Provisional Application No. 60/000,279 filed Jun. 16, 1995 from which priority is claimed, an insertable image is capable of being inserted at any location within the current image without requiring identification of an existing advertisement or a "target zone" area. Rather, a mathematical landmark model and related coordinate system imposed thereon are used to permit the system operator to pinpoint the location of an insertion virtually anywhere within the current image.

Figure 1:
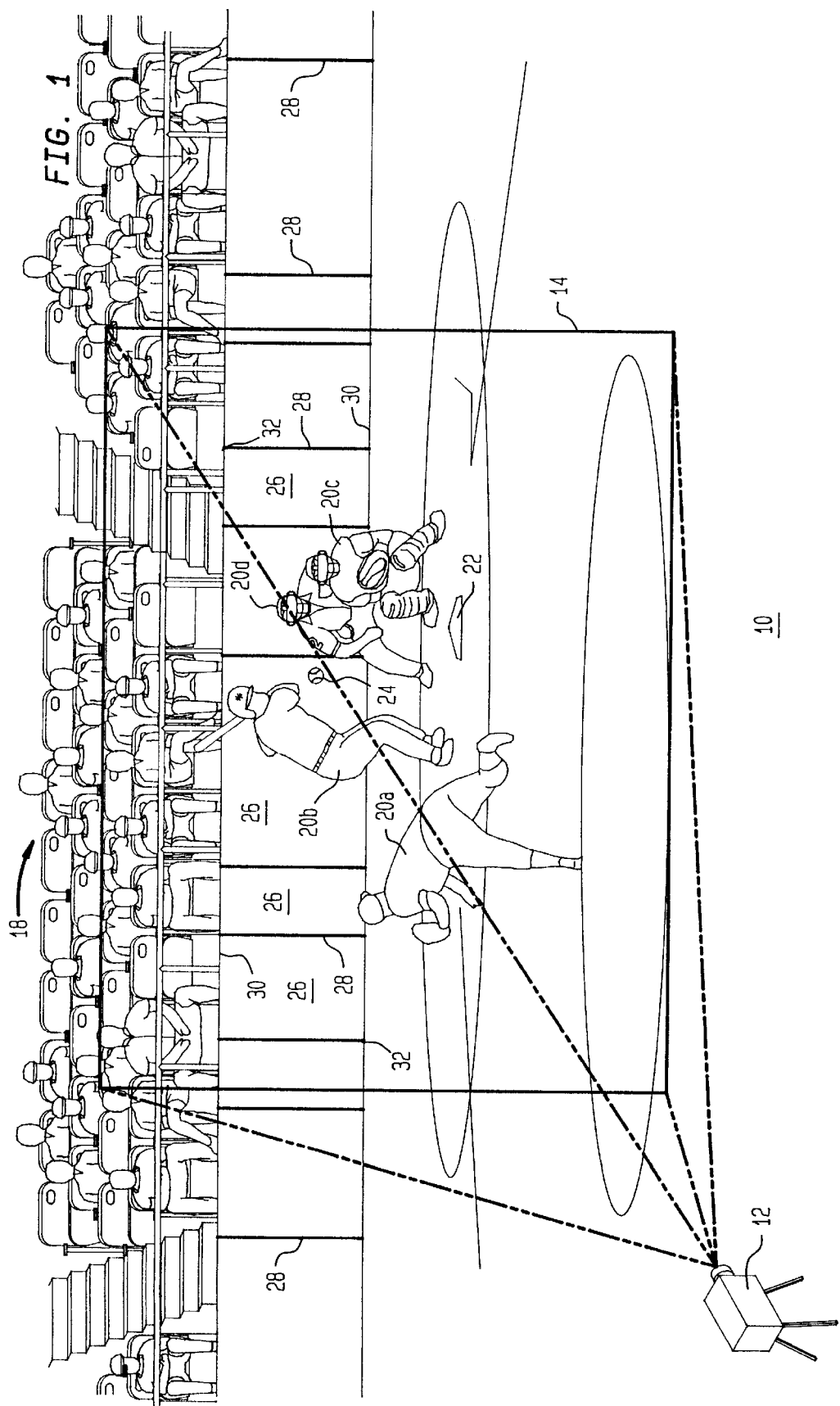
FIG. 1 illustrates a view of a baseball stadium during a live video broadcast showing a camera's current field of view identified within the stadium view.

FIG. 1 illustrates a stadium view 10 of a typical scene during a baseball game. A standard television camera 12 is shown with the current field of view 14 highlighted. The pan range of camera 12 may include most of the stadium. The remaining area 18 is outside of the camera's current field of view and comprises the rest of the stadium view not in the pan range. In the illustrated scene pitcher 20a is shown delivering a pitch to catcher 20c. A batter 20b stands poised to hit baseball 24 while umpire 20d observes the action. The present invention will place an advertisement or a commercial logo on the wall behind home plate during the broadcast of the game.

In order to insert an image into a live broadcast, the invention must be able to recognize the current image so that it can properly place an insert. The invention employs a landmark mapping scheme wherein prominent features of the scene have been predefined as landmarks. Landmarks are not determined as a function of the position of the insertion region and are preferably not within the insertion region. In particular, the landmarks are not unique to a particular insertion region. Rather, as dictated by the features of the reference image, the landmarks are spread like a constellation or tapestry throughout the reference image. The same set of landmarks is capable of locating numerous different insertion regions within the reference image. Recognition of the insertion region, sometimes referred to in the prior art as the "target zone", is, therefore, unnecessary. Landmark types generally comprise horizontal, vertical, diagonal, and corner features of a scene. In FIG. 1 the vertical seams of backboards 26 comprise vertical features 28 while the top and bottom horizontal edges of backboards 26 comprise horizontal features 30. Corner features 32 are defined at points where vertical features 28 and horizontal features 30 intersect. However, the whole region of panning, even outside the current field of view, contains features.

A. CREATING A REFERENCE IMAGE

Figure 2:
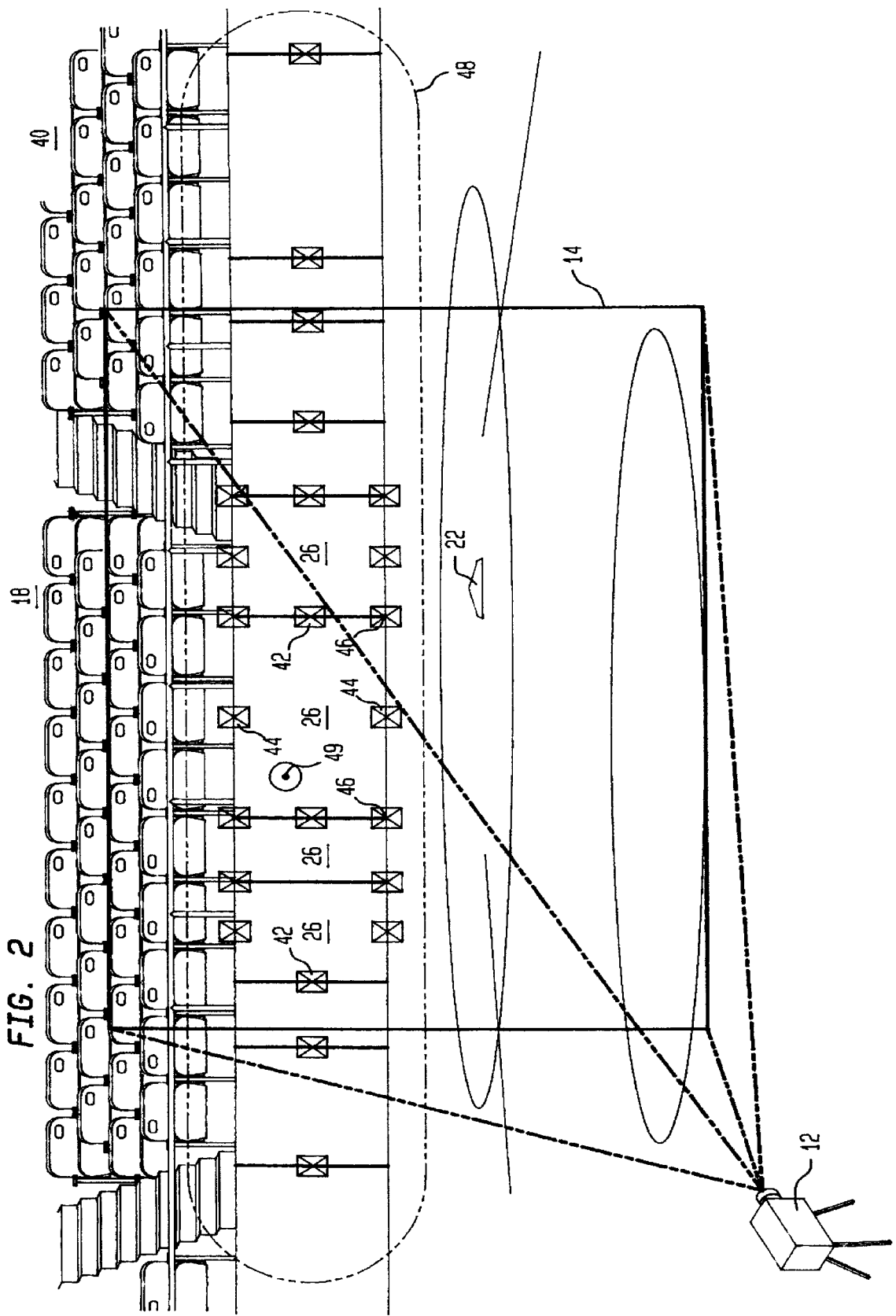
FIG. 2 illustrates a view of a baseball stadium prior to a broadcast showing a camera's current field of view identified within the stadium view.

Before an insertable image can be inserted into a live broadcast, the invention must have information regarding the location and types of landmarks. This is achieved by creating a reference image of the stadium in which landmarks are placed according to the prominent features of a given scene. In FIG. 2, a preliminary stadium view 40 of an empty stadium is shown. Camera 12 portrays the empty stadium 40 from the same perspective as in FIG. 1. Backboards 26 are shown with vertical landmarks 42, horizontal landmarks 44 and corner landmarks 46. Thus, FIG. 2 comprises a portion of a pictorial representation of the reference array 48. Although, the reference array 48 has been depicted pictorially, in reality it is nothing more than a data table of landmark locations and types which encompass the entire scene to be panned.

After the reference array 48 is obtained, its pictorial representation is analyzed. The analysis is premised on the use of the Burt Pyramid algorithm which can decimate the reference image into as many as four levels (e.g., levels 0–3), each level having decreased resolution by one half. Referring now to FIGS. 8A–D, four levels of decimation are shown with varying degree of resolution. The level 0 image 144 has the highest resolution at 240×720 pixels. The level 1 image 146 has half the resolution of level 0, namely 120×360 pixels. The level 2 image 148 has half the resolution of the level 1 image 146, 60×180 pixels. Lastly, the level 3 image 150, the lowest level, identifies relatively coarse features of landmarks 42, 44, 46 that survive to a resolution of 30×90 pixels. For each level, only the resolution changes. The size and the scale of the reference image 48 does not change for the different levels.

The position of various landmarks 42, 44, 46 are determined within the pictorial representation of the reference array 48 at all levels by a light pen, a trackball locator, or other similar means. Prominent features in the pictorial representation of the reference array, such as the goal posts in a football stadium or a physical structure present in the pictorial representation of the reference array 48, i.e. the wall behind home plate, are used by the system operator as the landmarks at each level. Landmarks are often selected such that they will survive decimation and remain recognizable to at least level 3. Each landmark is assigned an X,Y coordinate location. In addition, each landmark is assigned a type, e.g., vertical, horizontal, diagonal, or corner. The location for each landmark 42, 44, 46 is then stored in a computer system and this stored data set is the reference array itself.

Referring back to FIG. 2, once the landmarks 42, 44, 46 have been identified and assigned locations and types, a reference location 49 of an insertion region is selected by an operator using a light pen, a trackball locator, or other similar means. In particular, the operator selects a single X,Y coordinate location as the reference location 49 of the insertion region. This reference location 49 could correspond to the center point, top-right location of the intended insert, or any other suitable point of the insertable image. The reference location 49 is then stored in the computer system and is used to facilitate insertion of an insertable image as a function of the mathematical relationship of the reference location and the landmark locations. Of course, the reference location may simply be the origin of the X,Y coordinate system and the insertable image is then inserted at an X,Y position chosen by the operator.

B . PREPARING THE LOGO FOR INSERTION

The reference location 49 of an insertion is that location in the reference array 48 which defines the position to which the insertable image will be related. Selecting the landmarks 42, 44, 46 and the reference location 49 is done prior to the real-time insertion process. Further, the initial reference location can be changed by the system operator during the broadcast.

Once the reference location is identified, the insertable image is placed in the pictorial representation of the reference array 48 at the selected reference location 49. Next it is warped so that the pattern size and shape, i.e. perspective, is adjusted at the reference location 49 so that it fits snugly within the intended insertion area. The adjusted insertable image is then stored for use in the real-time insertion process.

Figure 10A:
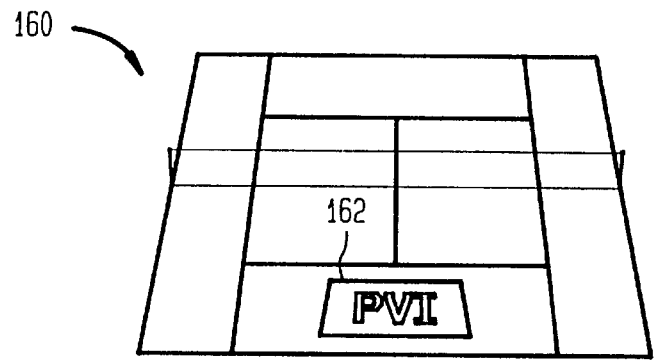
FIG. 10A illustrates a tennis court showing one potential position in which an insert can be placed during a broadcast.
Figure 10B:
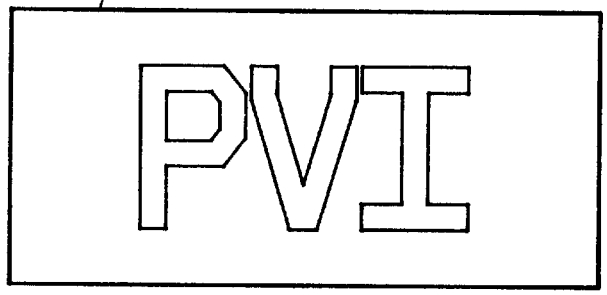
FIG. 10B is the initial artwork of a logo to be inserted into the image of the tennis court shown in FIG. 10A.
Figure 10C:
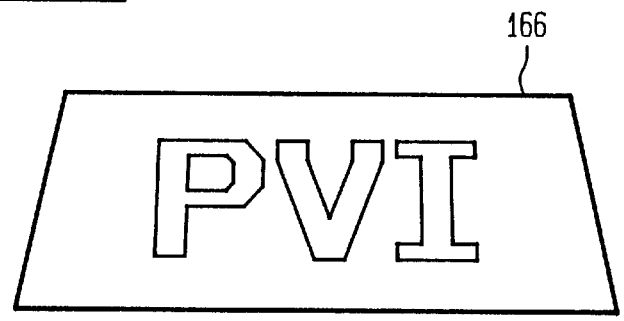
FIG. 10C illustrates a warped representation of FIG. 10A adjusted for the perspective of the tennis court during broadcast.
Figure 10D:
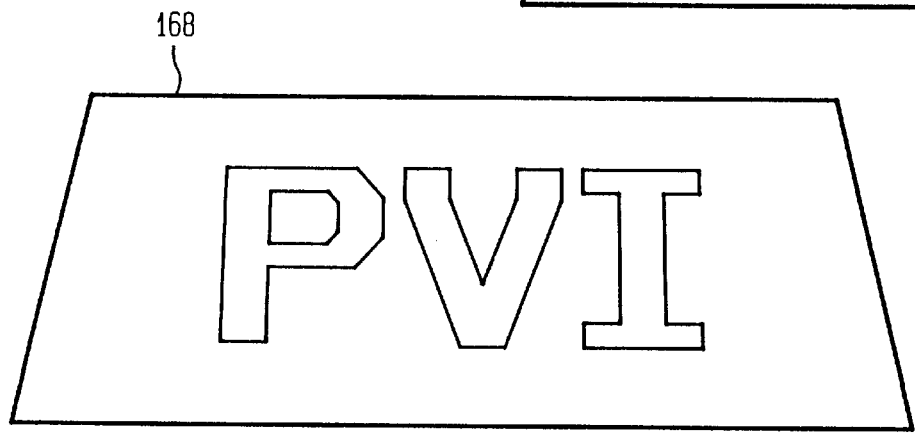
FIG. 10D illustrates a warped representation of FIG. 10C adjusted for a magnification zoom.
Figure 10E:
FIG. 10E illustrates a warped representation of FIG. 10C adjusted for a shrink zoom.

Preparing a logo for insertion into a broadcast is illustrated in FIGS. 10A through 10E. In FIG. 10A, an empty tennis court 160 is shown as the reference image. Within the court, an intended area of insertion 162 is shown. Although a tennis court has a rectangular shape, when viewed through a camera from a far end the court appears on video to have a slightly trapezoidal shape. Therefore, it is crucial to have the inserted logo reflect the slight trapezoidal nature of the image. FIG. 10B shows the artwork of a logo 164 in its original form. FIG. 10C shows a warped form of the logo 166 after it has been adjusted for its trapezoidal appearance due to the camera's point of view. FIGS. 10D and 10E each show the warped logo after being adjusted for a magnification or zoom factor. The logos 168, 170, shown in FIGS. 10D and 10E respectively, are warped for magnification or zoom only. This zoom warping occurs during the broadcast just prior to insertion as opposed to shape warping which occurs prior to the broadcast.

In some situations, such as in a tennis match, it is sometimes desirable to post adjust the perspective of the insert to match that of the scene. This is readily accomplished by measuring the distortion of the X, Y grid and distorting the insert accordingly.

C. LIVE INSERTION

Once the reference array 48 has been defined, a reference point 49 for the insertion region has been defined, and the artwork manipulated (FIGS. 10A–E), the real-time insertion process can begin.

Figure 3:
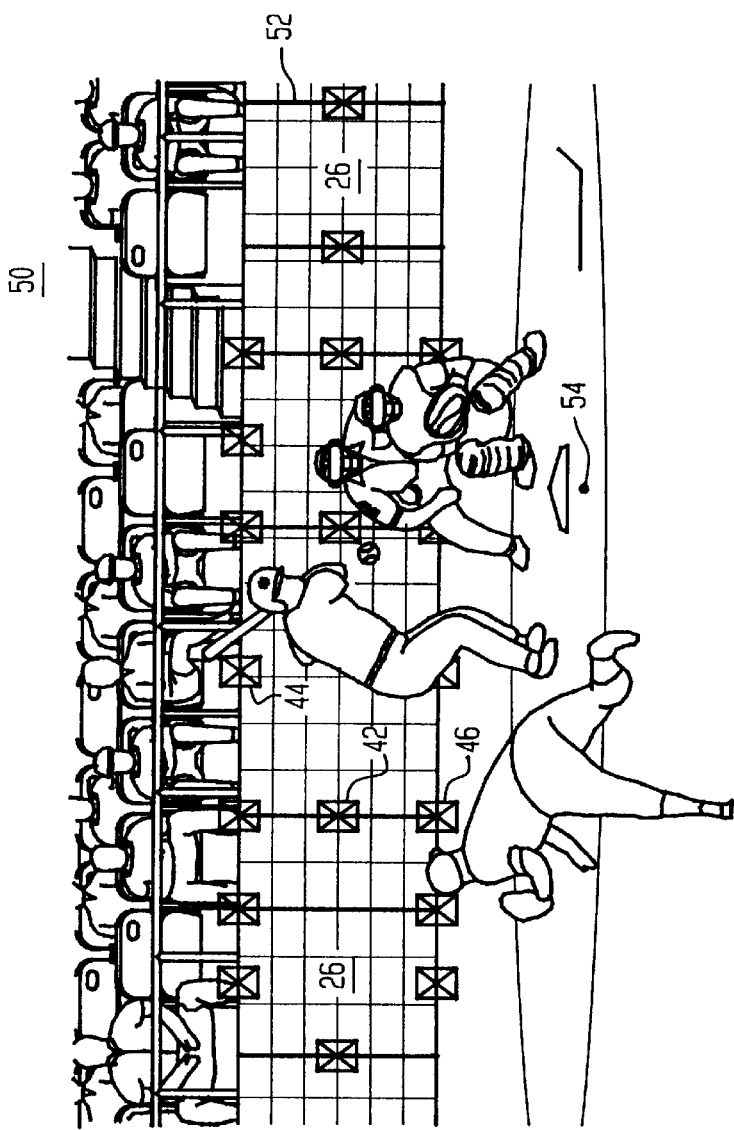
FIG. 3 illustrates a live shot of the camera's field of view overlayed with landmarks and an X, Y grid.

FIG. 3 is a superimposed or overlaid view 50 of the current field of view 14 of camera 12 in FIG. 1. A grid 52 has been superimposed over backboards 26. Landmarks 42, 44, 46 have also been overlaid onto the backboards 26. All the landmarks 42, 44, 46 in the current scene are searched for while the system is in the search mode so that the invention will be able to locate the proper point of insertion or reference location 49 for an advertisement or commercial logo. The system uses only those landmarks that it finds in the field of view.

Figure 4:
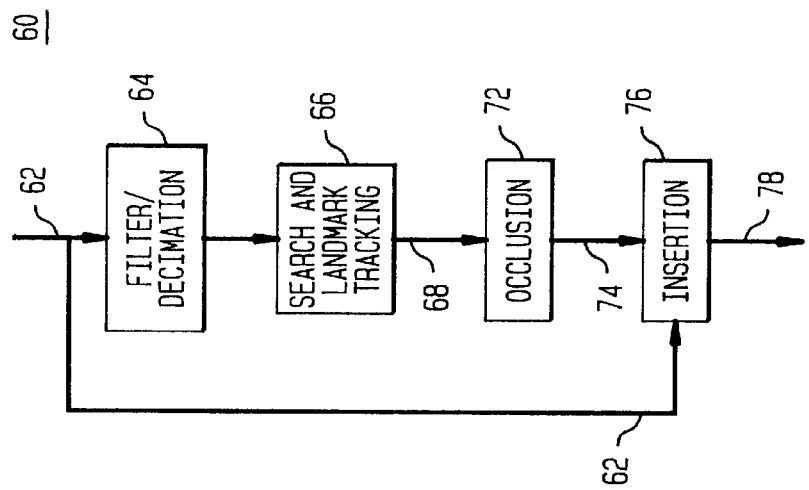
FIG. 4 is a block diagram showing the major components of the video insertion system according to the preferred embodiment of the invention.

FIG. 4 shows a general system diagram 60 of the major components of the system. Each field of a video signal 62 enters a filtering and decimation process 64 which cleans up the current field image then decimates the field image in the same manner discussed above. Decimation of the current field image is depicted in FIGS. 9A–D in which the level 0 image 152 has the highest resolution followed by the level 1 image 154, the level 2 image 156, and the level 3 image 158 having the coarsest resolution. The decimated field image is then fed to landmark search and tracking board 66 which has 3 functions. The first function is to search the decimated field image for landmarks. The second function is to verify the position of all landmarks found with respect to the reference array. The third function is to track the motion of the camera including any changes in magnification or zoom. The landmark tracking board 66 collects information and generates a data signal 68 containing illumination data, magnification data, horizontal location data, and vertical location data. This data signal 68 is then fed to an occlusion processor 72. The occlusion processor 72 decides whether the intended area of insert within the current image is being occluded, i.e. blocked in whole or in part by the action in the current scene. The result of the occlusion processor 72 is a signal 74 containing occlusion data which is fed into the insertion processor 76. The current image 62 and the insertable image are combined with the occlusion signal 74 yielding the output video image 78.

Figure 5:
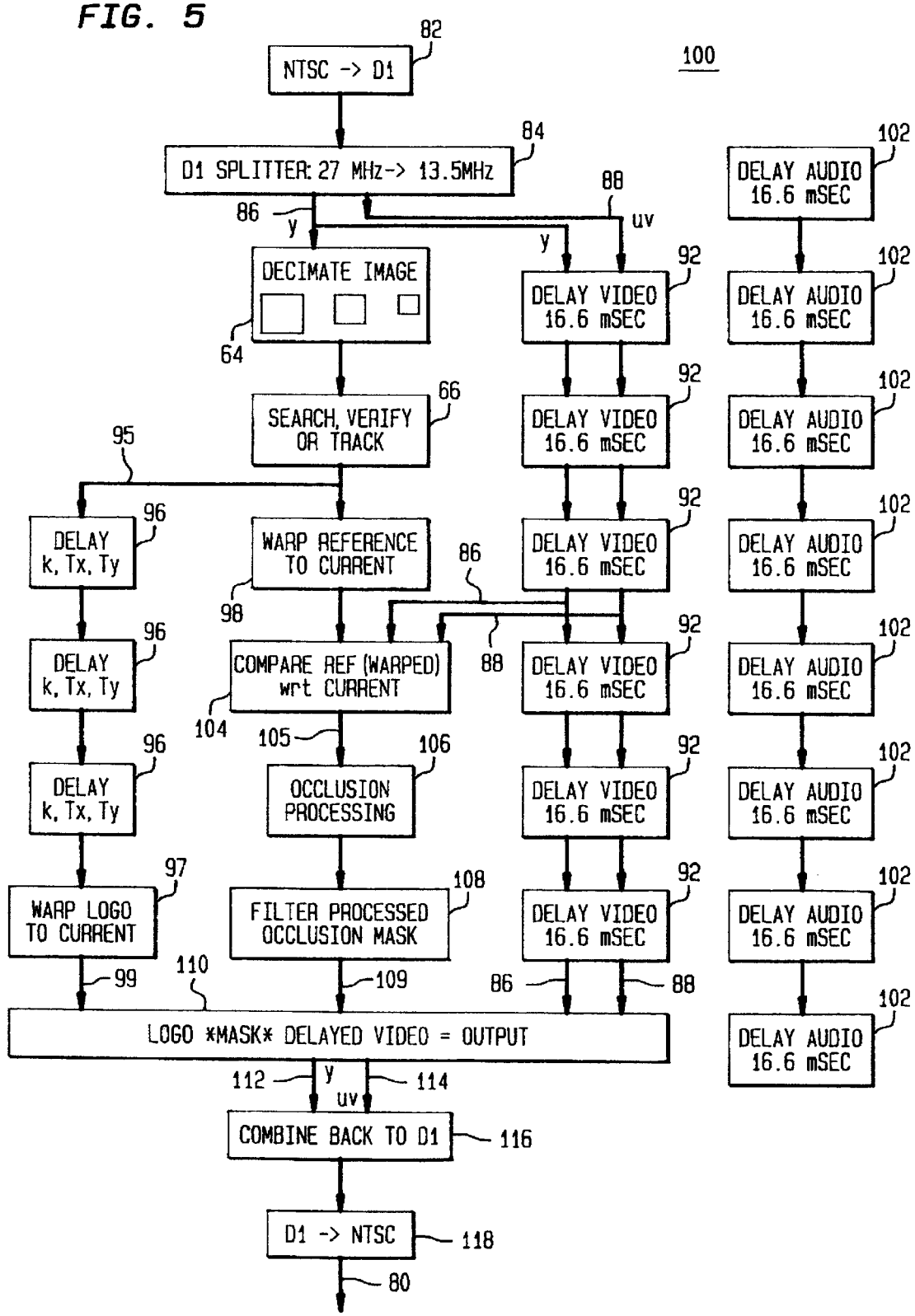
FIG. 5 is a detailed schematic diagram of the video insertion system according to the preferred embodiment of the invention.

FIG. 5 is a block diagram of the live video insertion system showing the timing of the entire process. Although the current system requires eight fields to accomplish the seamless insertion of a logo into a live video broadcast, an increase in processor speed would permit insertions in as few as three fields. There are two fields per frame and 30 frames per second in the video image if the NTSC TV system is being used. Thus, every second the system is operating on 60 fields.

In field 1, the current video signal is converted from analog to digital form by converter 82 and fed to a splitter 84 which splits the signal into its y 86 and uv 88 components. The separate y and uv components of the field image are fed into a series of video delays 92 designed to keep the broadcast synchronized while the image processing takes place. Simultaneously, the y component 86 is fed into the filtering and decimation process 90 which corrects and decimates the field image as described above. Alternatively, u and v images may also be filtered and decimated and further processed as described below.

In field 2, the filtered and decimated images are fed into landmark tracking board (LTB) 66 which performs search, verify and track functions. An information signal 95 containing illumination, magnification, horizontal translation, and vertical translation data of the current field image with respect to the reference image is generated.

In field 3, the information signal 95 from LTB 94 is fed to a series of delays 96. The LTB data signal 95 from field 2 is simultaneously fed to warper 98. Warper 98 warps a pictorial representation of a portion of the reference array to the current field image to adjust for magnification and horizontal and vertical translation of the current field image with respect to the reference array. The portion which is warped depends on the shape and location of the intended insertion.

In field 4, the filtered y, u and v components of the warped reference portion are compared to the filtered y, u and v components of the current video image by a comparator 104. The result is a signal 105 containing values reflecting the changes of the y, u, and v components between the current field image and the warped reference portion. If required, these changes can be further processed to average or cluster them over time or to average or cluster them in space to smoothe the changes and enhance the reliability of the occlusion processor.

As an example, in field 5, a square root calculation 106 is performed on a difference signal 105 on a pixel by pixel basis within the current field image. The result is compared to a threshold value in order to locate any areas that may be occluded in the current image. If the threshold is within a defined tolerance, then no occluding object is deemed present. If, however, the resultant value exceeds the threshold, then it is deemed that an occluding object is present within the current field image.

In field 6, the result of the threshold comparison is filtered to create an occlusion mask 108. This mask generates an occlusion mask key that will decide whether to broadcast the insert value or current field value of a given pixel. Simultaneously in field 6, warper 97 receives the delayed LTB data signal 95 using it to warp the logo to be inserted adjusting for magnification and horizontal and vertical translation of the current field image. In the case that the grid has been distorted, it may be necessary to include distortion in warping the logo for insertion.

In field 7, the warped logo 99, the occlusion mask key 109, and the delayed y 86 and uv 88 current field image components are inputs to a combiner 110. The combiner 110 will pass either the insert image 99 or the current field image components y 86 and uv 88 to broadcast depending on mask key 109.

In field 8, the resultant y 112 and uv 114 signal components are combined back to a single digital video signal. The digital signal is then converted back to analog format by converter 118 prior to being broadcast live. During video processing, the audio signal was delayed by 8 fields to ensure that the video and audio broadcast signals are in sync with each other when broadcast.

D. SEARCH

Figure 6:
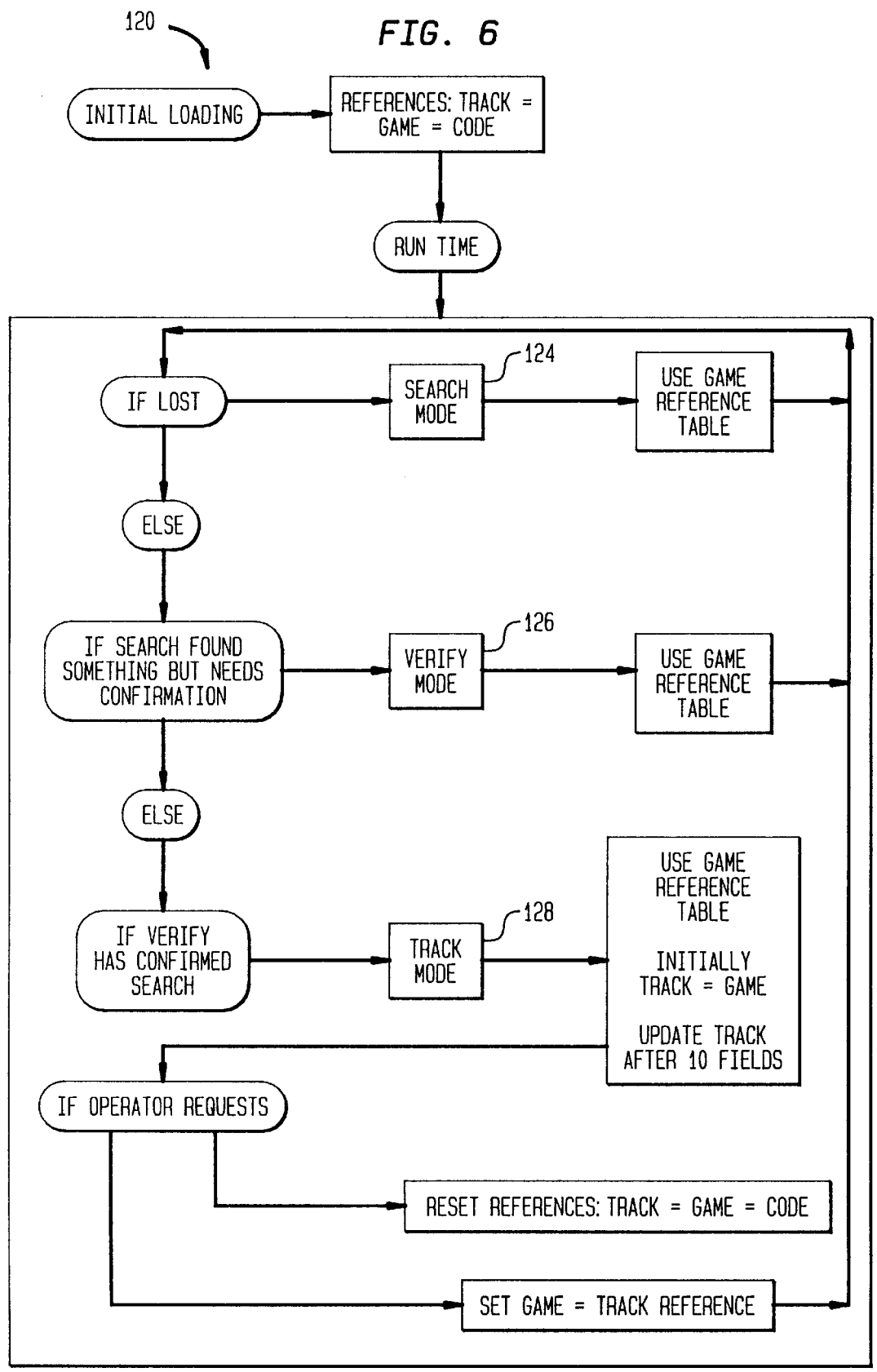
FIG. 6 is a block diagram of the Landmark Tracking Board (LTB).

Referring now to FIG. 6, when in search mode 124 the process often starts with a level 0–3 image 158 where a search is performed for a particular coarse feature, for example, a light to dark transition or a horizontal or vertical feature. The preferred mode for conducting the search is via the Burt Pyramid algorithm. The Burt Pyramid algorithm, which utilizes the decimated levels 152, 154, 156, 158 of the current image 14, allows for fast searching of the lower resolution levels for rapid identification of landmarks 42, 44, 46, since the lower resolution levels have less pixels to search in order to identify a particular feature compared to searching the higher resolution levels. If a search feature or landmark is found, an additional search for the same or another feature to verify the location of the coarse feature is performed by searching for a similar feature at a higher level in the area of the image identified in the level 3 search.

Referring back to FIG. 3, the level 3 search can be performed using an 8×8 template to create, for example, a 15×15 correlation surface. Each 8×8 template is tailored for a particular feature, such as a vertical line, a horizontal line, a diagonal line or a corner. The search function identifies landmarks 42, 44, 46 and returns an estimate of the translation in the X and Y directions (Tx, Ty) and the zoom (k), which in turn is used to determine the current position and orientation of the landmarks 42, 44, 46 in the current image 14, compared to the location of the landmarks 42, 44, 46 in the reference image 48. If the search mode 124 is successful, then the verify mode 126 is entered. It is often desirable to use search templates which are much larger than 8×8 if the features are large or the search is carried out at a low level of decimation.

E. VERIFY

The transition from the search mode 124 to the verify mode 126 is made if the search mode 124 produces a preset number of "good" landmarks. A "good" landmark has a correlation value within a fixed range of the correlation value produced in the reference image, and satisfies predetermined continuity and line checks. Correlation of a landmark 42 that is a vertical line could be checked to make sure that three consecutive correlations have a value within a limited range of each other, and the surface could be checked to the left and the right of the located line to detect the absence of a line in that location.

Verification is conducted at level 0 or level 1 for up to three fields. If there is no successful verification, then the system returns to the search mode 124. If the verification criteria are met, then insertion of an insertable image is performed. No insertion is performed, however, unless certain criteria are met and the number of good landmarks must exceed a preset value. In addition, more than two landmarks must be vertical thereby insuring a good zoom calculation. Further, a portion of all landmarks must be "quality" landmarks.

Figure 7A:
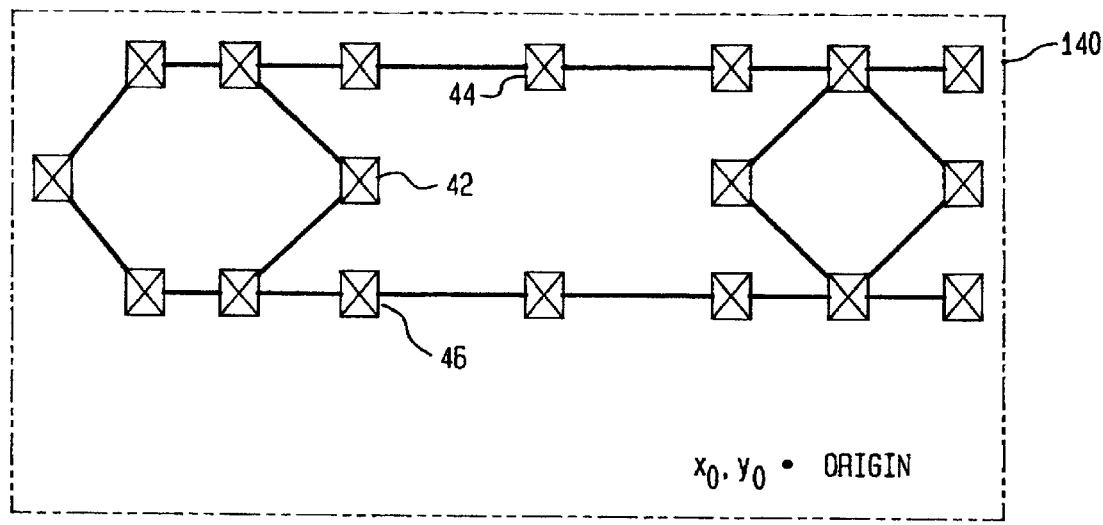
FIG. 7A is a mathematical landmark model of FIG. 2.
Figure 7B:
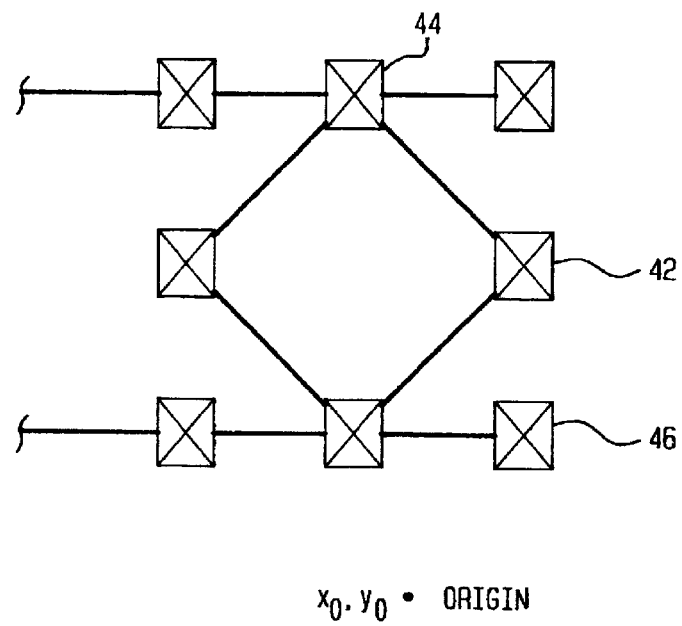
FIG. 7B illustrates a detailed portion of FIG. 7A.
Figure 9A:
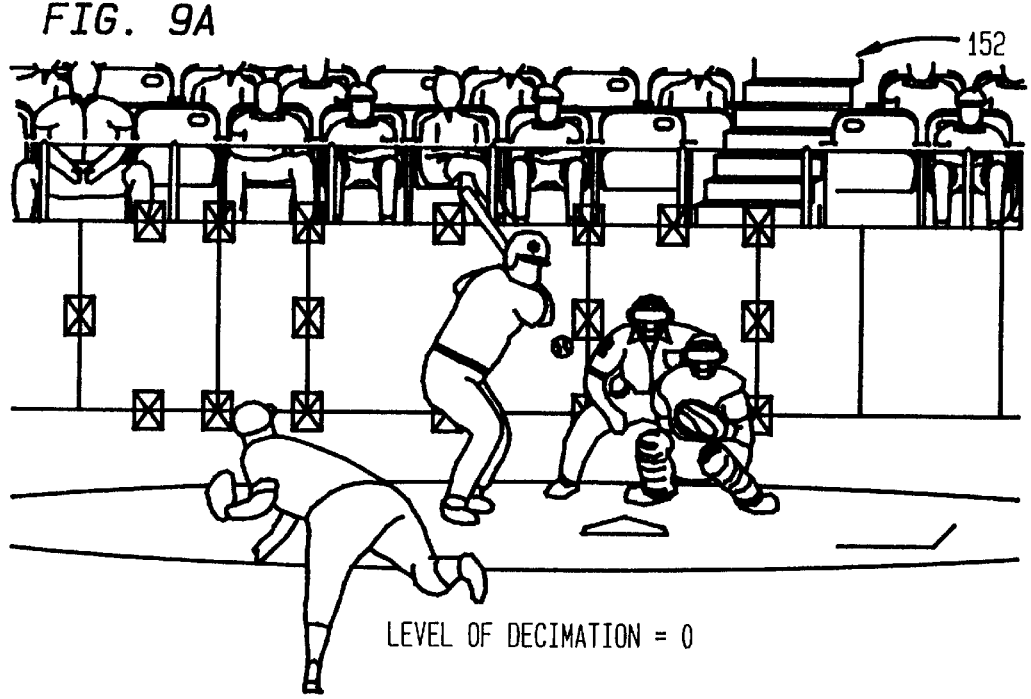
FIGS. 9A–D illustrate four levels of decimation of the current image with the landmark model superimposed thereon and where the resolution is halved in each level.
Figure 9B:
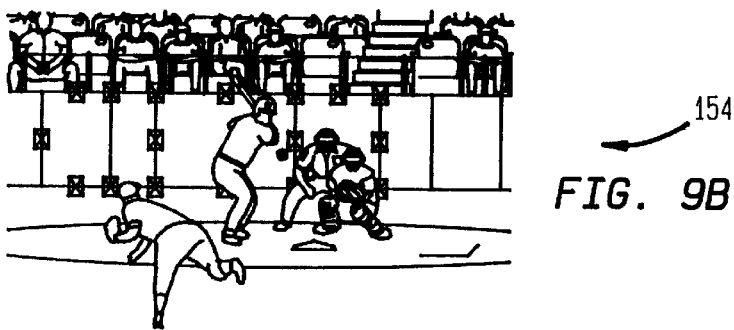
Figure 9C:
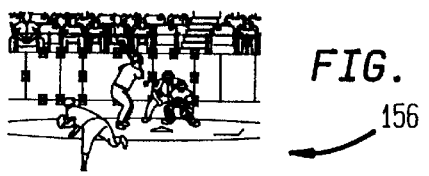
Figure 9D:

A quality landmark is defined as having a distance error weighting above a predetermined value, determined as a function of the distance between the current landmark, i.e. the landmark in the current image, from where the previous landmark model predicted the current landmark would be. Referring to FIG. 7A, a landmark model 140 is the model formed by landmarks 42, 44, 46 in each field. The first landmark model is established by the landmarks 42 44 46 in the reference array image 48 of FIG. 2.

The landmark model 140 is formed by determining a geometric relationship between the landmarks 42, 44, 46. Thus, during the search mode 124, the landmarks 42, 44, 46 for the current field image 14 are compared to the landmark model 140 generated in the reference image 48 to determine the translation and zoom changes from the reference image 48 to the current field image 14. In a subsequent field, the landmarks 42, 44, 46 are again located and the location of each current landmark is compared to its predicted location based on the landmark model 140 from the prior field. The landmarks 42, 44, 46 in the current field image 14 are fitted to the prior landmark model 140 using a least squares fit. This comparison with the prior landmark model 140 generates a weight to be assigned to the location of each current landmark 42, 44, 46. The weight assigned to each current landmark 42, 44, 46 is used in the calculation of a new landmark model 140 for the current landmarks 42, 44, 46. The final verification criteria is that there must be no missing landmarks, or if a landmark is missing, it must be occluded. Moreover, if the search results are sufficiently accurate, the verify step may be eliminated.

F. TRACKING

When the verification criteria are satisfied, the program enters the tracking mode 128. Following insertion and occlusion in the verification mode 126, the system enters the tracking mode 128, which indicates how the camera 12 is moving. The system obtains information on the movement of the camera 12 from the current field image 14 by monitoring the motion of the landmarks 42, 44, 46. The tracking functions are performed at the current level 0 image 152 or the current level 1 image 154. As explained above, the landmarks 42, 44, 46 in each field are collectively referred to as a landmark model 140. In a continuous image where the camera 12 is directed at a particular scene each subsequent field is substantially similar to the previous field. Thus, in the tracking mode 128, a pixel by pixel search using tailored templates in the extended region of the location of each landmark 42, 44, 46, as predicted by the previous field landmark model 140, determines the incremental change in the position of the scene.

When in the tracking mode 128, no search function is performed, although the decimated images 152, 154, 156, 158 in levels 0–3, for example, continue to be generated for each field. While there is a selectable limit on the number of landmarks that must be present to do tracking, there must be more than two landmarks in the zoom direction (vertical) and at least one other landmark in another (e.g. horizontal) direction. If, however, the zoom measurement is lost for no more than three frames, the system will continue to operate if there is at least one landmark. The tracking function uses Gaussian rather than the LaPlacian decimated images, which improves the signal to noise ratio and preserves valuable lower frequency information. If the tracking criteria are not met, than the system returns to the search mode 124.

G. OCCLUSION

Just prior to insertion, the system performs an occlusion operation on the pattern to be inserted into the insertion region. Occlusion accounts for obstacles in the actual current field image which may occlude, to some extent, the insertion region. In order to perform a real-time insertion that is realistically merged into the current image 14, obstacles in the insertion region must be identified and the insertion adjusted, and in some cases withheld, so as not to insert an insertable image over an obstacle.

First, a filtered pictorial representation of a portion of the reference array is generated. To generate this filtered representation, the reference image is filtered to reduce the high-frequency components. The lower-resolution representation of the reference array is regularly updated for brightness via illumination-sensitive sensors which are positioned in close proximity to the insert locations within the stadium. This is done to match the brightness of the pictorial representation to the current field image 14. The results are stored in the computer system. Each current field image 14 is also filtered to reduce the high-frequency components yielding a lower-resolution representation of the current field image 14. The filtering of the reference array 48 is often greater than the filtering of the current image 14.

Since the objects which occlude the inserted image are real physical objects, in general they will be larger than one pixel and appear in more than one frame. Therefore, the accuracy and noise of the occlusion processing can be additionally improved by clustering the occluding pixels into groups and by tracking their motion over time from field to field. Thus, better judgments can be made about whether a particular pixel is part of an occluding mass or not.

As a function of the location, size and illumination of the current image 14, a portion of the lower resolution representation of the reference array 48 is adjusted for translation (location) and zoom (size), as well as for illumination, as indicated previously. The modified lower resolution representation of the reference array 48 is then compared, on a pixel by pixel basis, with the lower resolution representation of the current image 14 to identify any obstacles in the reference image 48, the pixels in the reference and current images now having a 1:1 ratio. As a result of the comparison, a transparency function or mask key is determined which can then be applied to the insertable image during insertion to properly account for any obstacles that may be present in the insertion region, and thus may affect the insertion of certain pixels into the current image 14.

H. INSERTION

The insertion operation is performed as follows. As explained earlier, the insertion region has a mathematical relation to a pre-selected reference location 49. The reference location 49, in turn, has a mathematical relationship with the landmark model 140 identified in the reference image 48. That is, the reference location 49 of the insertion region has a relative position with respect to the landmark model 140. As indicated above, by determining the change in the translation and zoom of the landmarks 42, 44, 46 in the current image 14 compared to the reference image 48, the corresponding change in the translation and zoom of the insertion region can be determined as a function of the reference location 49. Thus, the X and Y translation of the reference location 49 is calculated, the zoom function is applied to the stored insertable image, and the insertable image is inserted into the insertion region of the current image 14 on a pixel by pixel basis, using the reference location 49 of the insertion region as a reference point for positioning the insertable image.

Figure 11:
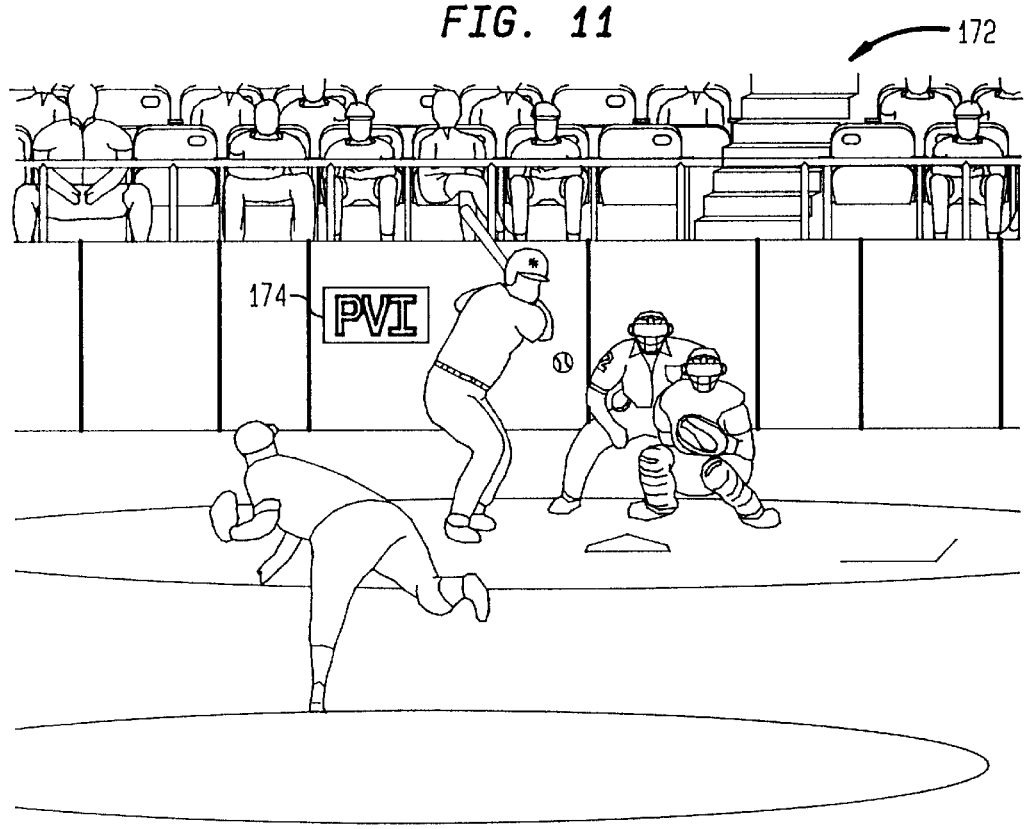
FIG. 11 illustrates the current image with the stationary insert placed in a location without occlusion.

FIG. 11 shows a current field image 172 as seen by the television viewer. Insert 174 appears on the back wall behind home plate. This example shows a static insertion 174 that is not being occluded by the current action of the game. Further, the magnification factor of this example is k=1 or no zoom change from the reference.

Figure 12:
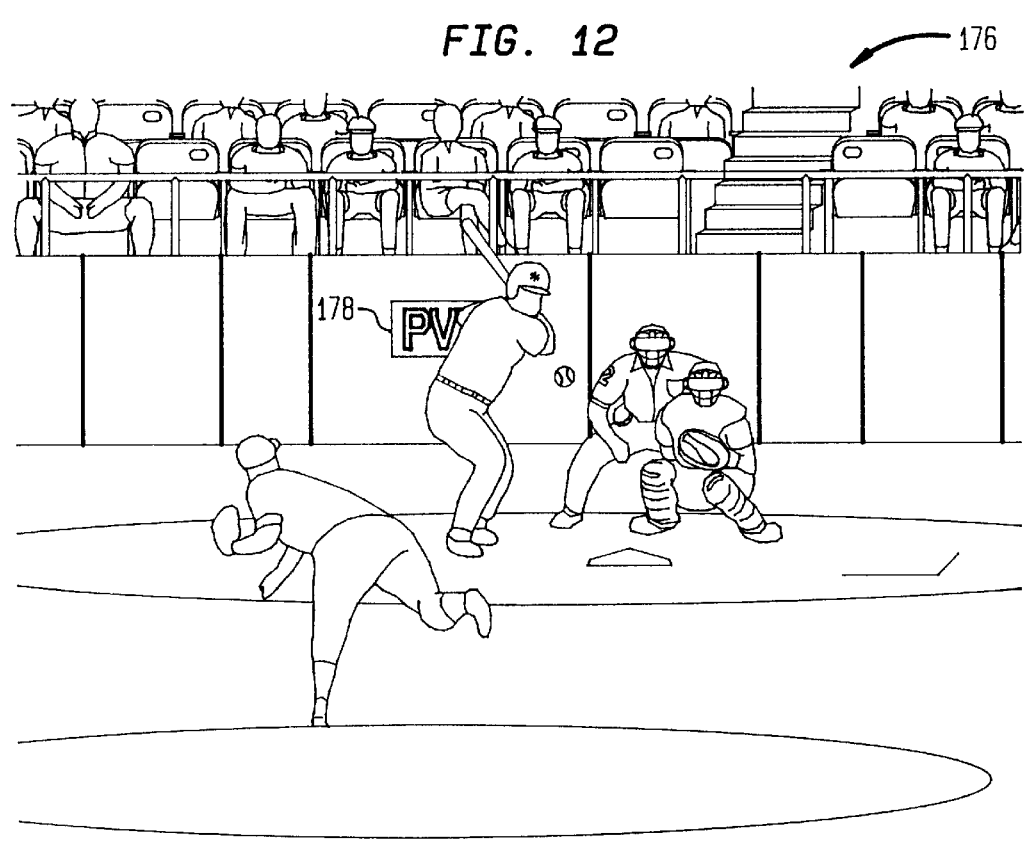
FIG. 12 illustrates the current image with the stationary insert placed in a location with occlusion.

FIG. 12 shows a current field image 176 as seen by the television viewer. Insert 178 appears partially obstructed on the back wall behind home plate. This example shows a static insertion 178 that is being occluded by the current action of the game. The system keeps the logo in the background of the scene. Again, the magnification factor of this example is k=1 or no zoom change.

Figure 13:
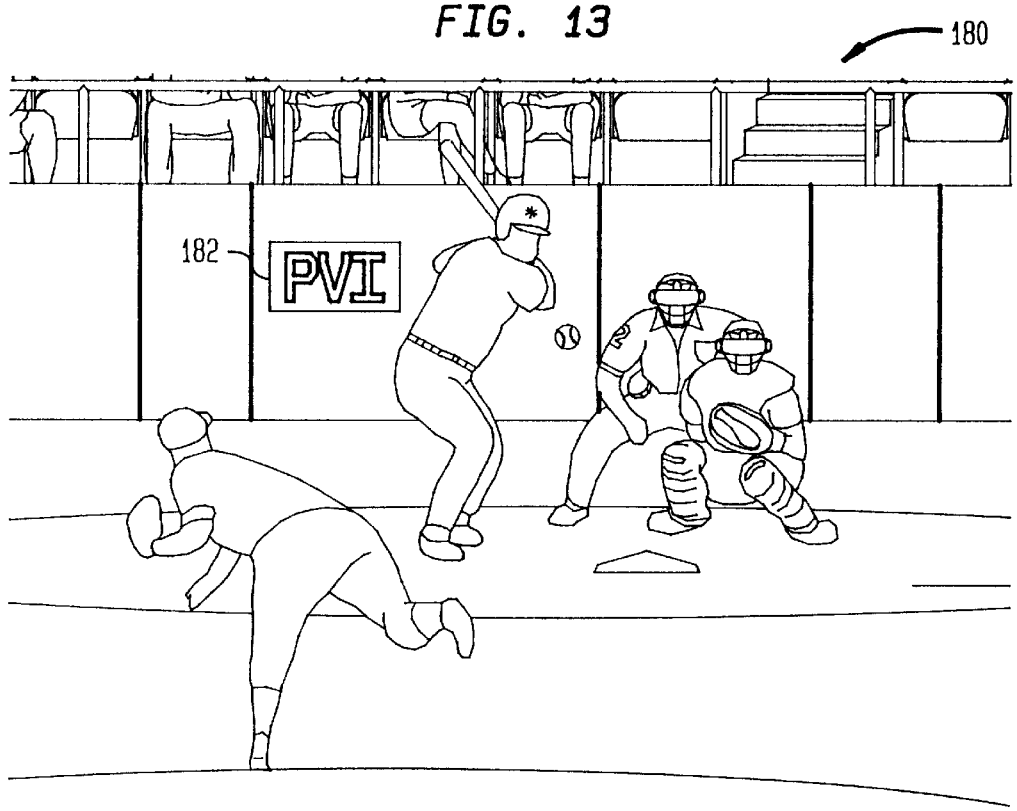
FIG. 13 illustrates the current image with the stationary insert placed in a location without occlusion but adjusted for magnification zoom.

FIG. 13 shows a current field image 180 as seen by the television viewer. Insert 182 appears on the back wall behind home plate. This example shows a static insertion 182 that is not being occluded by the current action of the game. This time, however, the magnification factor is k>1 which is a magnification.

Figure 14:
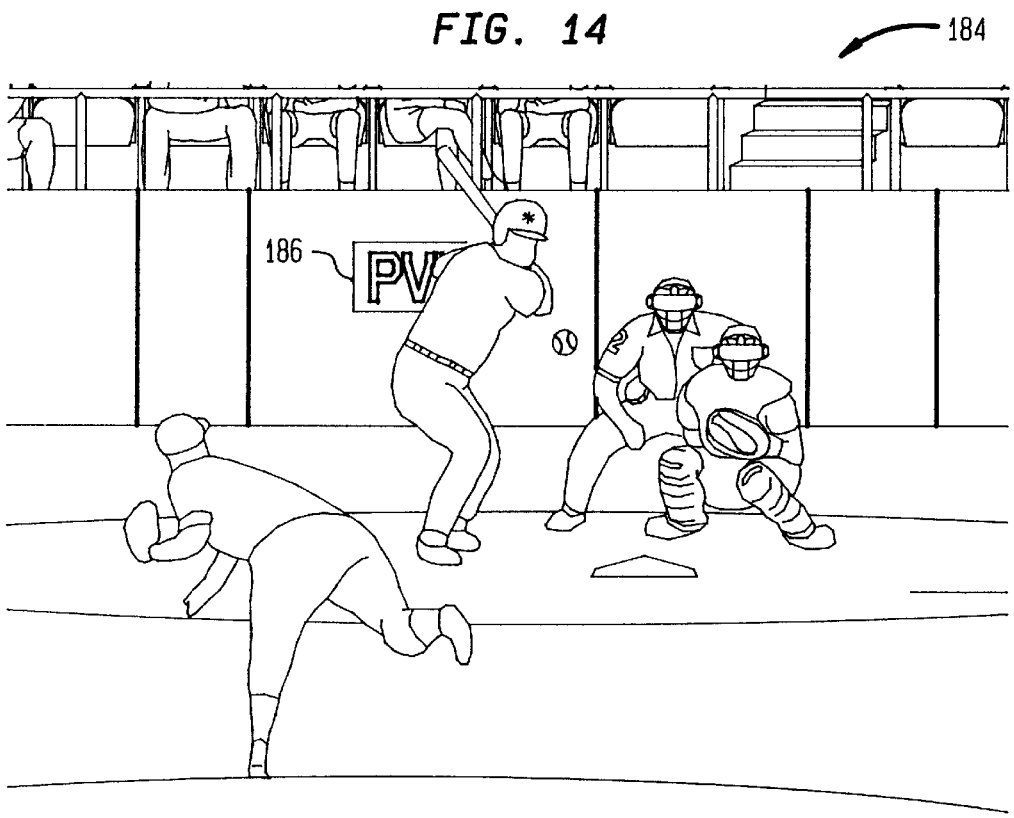
FIG. 14 illustrates the current image with the stationary insert placed in a location compensated for occlusion and adjusted for a magnification zoom.

FIG. 14 shows a current field image 184 as seen by the television viewer. Insert 186 appears partially obstructed on the back wall behind home plate. This example shows a static insertion 186 that is being occluded by the current action of the game. The system keeps the logo in the background of the scene. Again, the magnification factor of this example is k>1.

Figure 15:
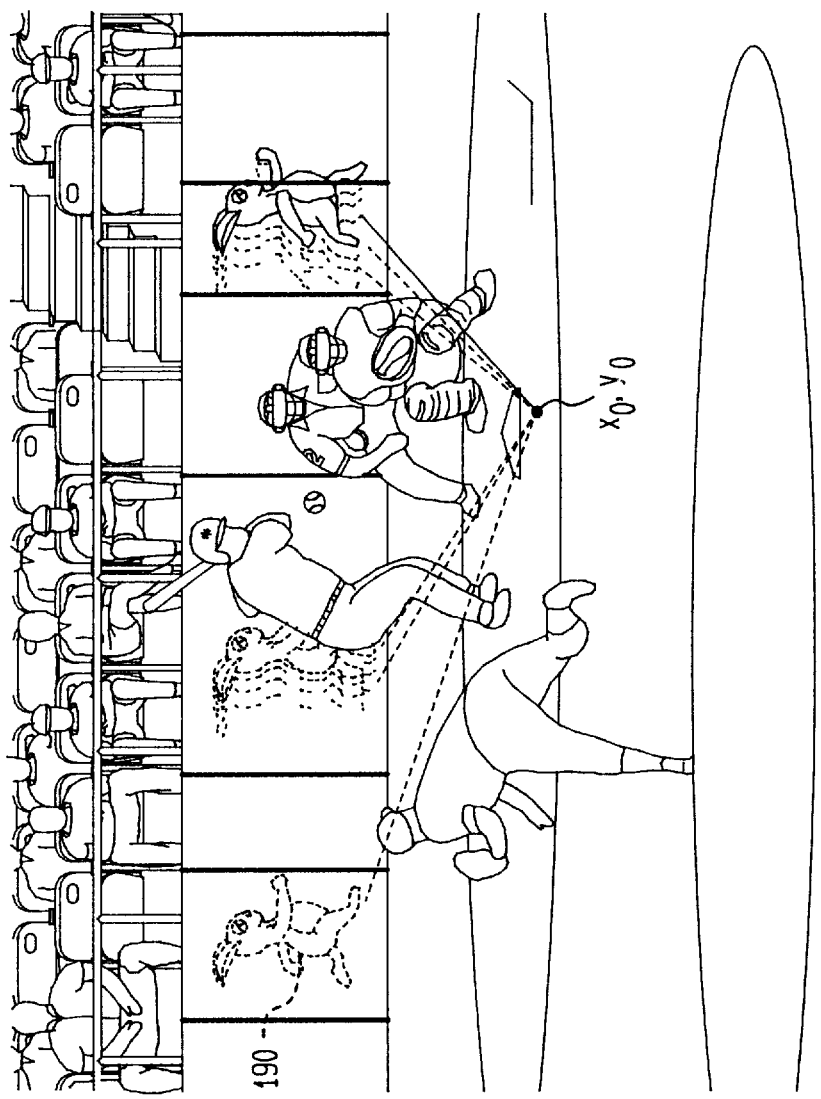
FIG. 15 illustrates a dynamic insertion of a logo showing the logo moving left to right.

FIG. 15 shows a current field image 188 as seen by the television viewer. The inserted image 190 of a walking rabbit appears to be moving horizontally across the screen in each subsequent field. Additionally, the rabbit itself is changing shape in that its arms and legs are moving in each new field. This example illustrates the dynamic insert capability of the present invention. An insertable image is not limited to one region or one shape. The location and shape of the insert 190 may be altered from field to field by an operator on a real-time basis, or altered automatically by a preprogrammed sequence or video.

Figure 16:
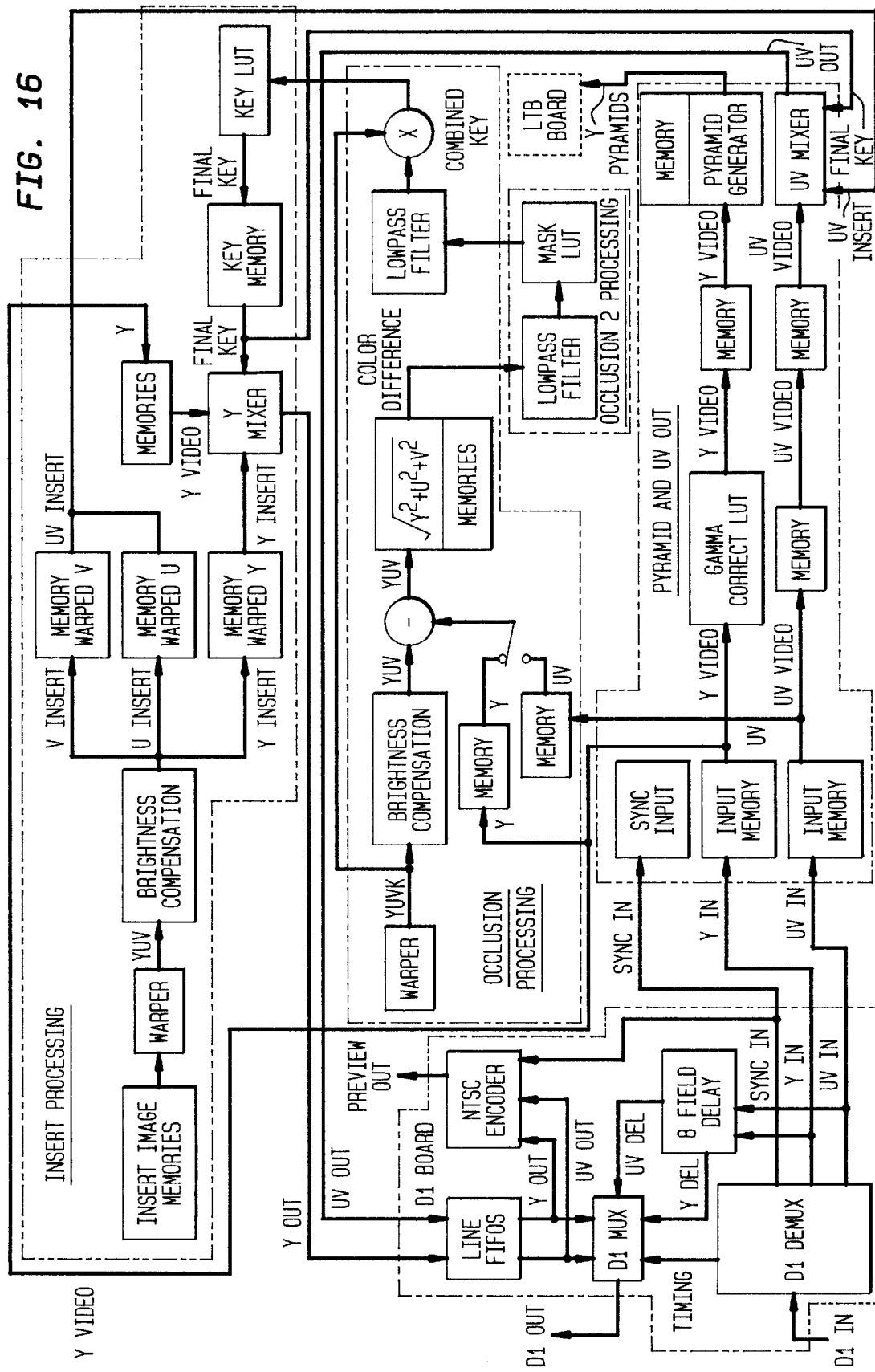
FIG. 16 is a schematic representation of the hardware implementation of the system and method of the preferred embodiment of the invention.

FIG. 16 is a schematic representation of the hardware implementation of the system and method of the preferred embodiment of the invention.

The above described system has a number of significant advantages over prior art systems.

First, the present invention is capable of seamlessly placing an insertable image directly into a live video broadcast without having to identify any particular existing advertisement or "target zone" in the current scene. Therefore, the insertable image appears natural and seamless within the broadcast and does not pop up noticeably in the current field of view.

Second, the system can easily insert a moving insertable image within the live video broadcast. Further, the system can move the insertable image two different ways within the current scene. First, the insert as a whole can change its position within the current scene. Second, the insertable image itself can change its own shape from field to field. Thus, the present invention can readily support insertion of dynamic images within a live video broadcast.

Third, the system automatically adjusts the zoom factor of the insertable image without external sensory input. Zoom adjustments are calculated based on the spatial relationship of objects within the current scene and not on sensed physical adjustments of the camera itself or non-repeatable sensors on the camera. Therefore, the present invention is not susceptible to performance degradations due to unwanted camera motion.

Fourth, the system is operated on a real-time basis in that insertable images and their points of insertion need not be run by a "canned" process. The system operator can choose virtually any point of insertion within the current scene during the actual broadcast. For example, if a particular section of a stadium is relatively empty of fans the operator could insert an image over the empty seats. Thus, the system operator can use space that was not known to be available prior to the live broadcast.

While the invention has been described with reference to the preferred embodiment thereof, it will be appreciated by those of ordinary skill in the art that various modifications can be made to the structure and function of the individual parts of the system without departing from the spirit and scope of the invention as a whole.

We claim:

1. A method of placing an insertable image into a live video broadcast scene containing natural landmarks, said method comprising the steps of:
   a. creating a landmark model characteristic of a first set of natural landmarks in a given scene, said landmark model comprising a sub-pixel accurate, geometric relationship between landmarks;
   b. superimposing a coordinate system on said landmark model capable of registering each landmark position at a sub-pixel level of accuracy to thereby create a reference array of landmark positions;
   c. defining a required location of said insertable image with respect to said reference array;
   d. scanning said scene with a video camera to create a current image;
   e. identifying a second set of natural landmarks in said current image, corresponding to a sub-set of the original first set of natural landmarks, by using the landmark model;
   f. comparing the sub-pixel location of multiple corresponding landmarks from the second set of natural landmarks located in said current image with their location in the reference array as defined by the landmark model and using that comparison to calculate the zoom and translation of the current scene with respect to the reference array of landmarks; and,
   g. inserting said insertable image into said current scene of said live video broadcast at a location in the current image corresponding to the defined required location, with sub-pixel accuracy,
      wherein said insertable image appears natural in said live video broadcast.

2. A system for placing an insertable image into a live video broadcast scene containing natural landmarks, said system comprising the steps of:
   a. creating means for creating a landmark model characteristic of a first set of natural landmarks in a given scene, said landmark model comprising a sub-pixel accurate, geometric relationship between landmarks;
   b. superimposing means for superimposing a coordinate system on said landmark model capable of registering each landmark position at a sub-pixel level of accuracy to thereby create a reference array of landmark positions;
   c. defining means for defining a required location of said insertable image with respect to said reference array;
   d. scanning means for scanning said scene with a video camera to create a current image;
   e. identifying means for identifying a second set of natural landmarks in said current image, corresponding to a sub-set of the original first set of natural landmarks, by using the landmark model;

f. comparing means for comparing the sub-pixel location of multiple corresponding landmarks from the second set of natural landmarks located in said current image with their location in the reference array as defined by the landmark model and using that comparison to calculate the zoom and translation of the current scene with respect to the reference array of landmarks; and, g. inserting means for inserting said insertable image into said current scene of said live video broadcast at a location in the current image corresponding to the defined required location c, with sub-pixel accuracy, wherein said insertable image appears natural in said live video broadcast.

3. The method of claim 1 wherein step (a) further comprises the steps of:

h. scanning the scene with a video camera to create a preliminary image of said scene; and, i. identifying said first set of natural landmarks in said preliminary scene; and, j. mathematically organizing said first set of natural landmarks into said landmark model.

4. The method of claim 3 above wherein said video camera has a variable field of view and said method further comprises the further step of:

k. continually searching the field of view of said video camera to identify landmarks in the current scene; and, l. tracking landmarks identified in step (k) above in order to keep the landmarks in the current scene aligned with the landmarks in the landmark model.

5. The method of claim 4 wherein said identification of said landmarks in step (e) further comprises the step of:

m. decimating the preliminary scene by incremental steps to at least 3 levels of decimation to determine what landmark features will survive searching and tracking in a current scene.

6. The method of claim 5 wherein the identification of said landmarks in step (i) above further comprises the step of:

n. decimating the current scene by incremental steps to at least three levels of decimation to determine what landmark feature will survive searching and tracking in a current scene.

7. The method of claim 6 wherein said decimating steps (m) and (n) above further comprise performing a Burt Pyramid analysis.

8. The method of claim 7 wherein said insertable image is a static image.

9. The method of claim 8 further including the following step:

o. translating said static insertable image across the current scene by incrementally changing its coordinates from frame to frame with respect to a reference point.

10. The method of claim 7 wherein said insertable image is a dynamic image.

11. The method of claim 10 wherein said dynamic image changes shape from frame to frame when inserted into said current scene.

12. The method of claim 11 further including the following step:

p. translating said dynamic insertable image across the current scene by incrementally changing its coordinates from frame to frame with respect to a reference point.

13. The method of claim 12 above further comprising the step of:

q. automatically adjusting the zoom scale of the insertable image in response to changes of location of identified landmarks in the current scene with respect to each other.

14. The method of claim 13 wherein said coordinate system also includes a reference point and wherein said insertion step (g) further comprises the step of inserting said insertable image into said current scene at a location determined with respect to said reference point.

15. The method of claim 14 further comprising the step of:

r. artificially enhancing the visibility of natural landmarks so that they can be more readily identified by Burt Pyramid analysis.

16. The method of claim 15 wherein step (a) includes the step of creating a two-dimensional landmark model which is characteristic of said first set of landmarks in said given scene.

17. The method of claim 16 further comprising the step of:

s. adjusting said insertable image to match distortion in said two-dimensional landmark model.

18. The method of claim 17 wherein step (a) includes the step of creating a three-dimensional landmark model which is characteristic of said first set of landmarks in said given scene.

19. The method of claim 18 further comprising the step of:

t. adjusting said insertable image to match distortion in said three-dimensional landmark model.

20. The method of claim 19 further comprising the step of:

u. preparing artwork for said insertable image and adjusting it for perspective and storing the same prior to insertion and adjustment for zoom.

21. The system of claim 2 wherein said coordinate system is an X, Y grid coordinate system and further comprises:

a reference point means incorporated in said X, Y grid coordinate system for determining the distance between a specific point in said X, Y grid coordinate system and the point of insertion of said insertable image.

22. The system of claim 21 further comprising:

tracking means for keeping the landmarks identified in said current scene aligned with the landmarks in said landmark model.

23. The system of claim 22 wherein said identifying means includes a decimation means for decimating the current scene by incremental steps to at least three levels of decimation to determine what landmark features will survive searching and tracking in a current scene.

24. The system of claim 23 wherein said decimating means comprises a Burt Pyramid decimating means.

25. The system of claim 24 wherein said insertable image is a static image.

26. The system of claim 24 wherein said insertable image is a dynamic image.

27. The system of claim 26 wherein said dynamic image changes shape from frame to frame after it is inserted into said current scene.

28. The system of claim 27 further comprising:

image driving means for driving said insertable image across the current scene by incrementally changing its coordinates with respect to said coordinate system from frame to frame.

29. The system of claim 28 further comprising:

zoom adjustment means for automatically adjusting the scale of said insertable image in response to changes of location of identified landmarks in the current scene with respect to each other.

30. The system of claim 29 further comprising:

distortion matching means for adjusting said insertable image to match distortion in said X-Y grid.

31. The system of claim 30 further including:

landmark enhancement means for artificially enhancing the visibility of natural landmarks so they could be more readily identified by said identifying means.

32. The system of claim 31 wherein said landmark model is a two-dimensional landmark model.

33. The system of claim 32 wherein said landmark model is a three-dimensional landmark model.

34. The system of claim 33 wherein said scanning means comprising a video camera.

35. The system of claim 34 wherein said scanning means also scans a preliminary scene and wherein said identifying means also identifies landmarks in said preliminary scene scanned by said video camera and wherein said landmark model is a mathematical model formed by the landmarks in said preliminary scene identified by said identifying means.

36. The method of claim 1 wherein said comparing step (f) is performed by comparing the sub-pixel location of at least three corresponding landmarks.

37. The method of claim 36 wherein said calculation of the zoom and translation in step (f) is performed in a single computational pass.

38. The method of claim 37 further including the following step:

h. using said landmarks located in said current scene to modify the reference array of landmark positions for use in subsequent scenes.

39. The method of claim 38 wherein the location in the current image referenced in step (g) corresponds to a predefined path of locations in the reference coordinate system.

40. The method of claim 38 wherein the location in the current image referenced in step (g) corresponds to an operator controlled arbitrary location in the reference coordinate system, which location may vary from scene to scene.

41. The system of claim 2 wherein said comparing means (f) is performed by comparing the sub-pixel location of at least three corresponding landmarks.

42. The system of claim 42 wherein said calculation of the zoom and translation in comparing means (f) is performed in a single computational pass.

43. The system of claim 42 further comprising:

h. utilization step for utilizing said landmarks located in said current scene to modify the reference array of landmark positions for use in subsequent scenes.

44. The system of claim 43 wherein the location in the current image referenced in inserting means (g) corresponds to a predefined path of locations in the reference coordinate system.

45. The system of claim 43 wherein the location in the current image referenced in inserting means (g) corresponds to an operator controlled arbitrary location in the reference coordinate system, which location may vary from scene to scene.

* * * * *